United States Patent
Umbehocker

(10) Patent No.: US 9,158,458 B2
(45) Date of Patent: Oct. 13, 2015

(54) GLOBAL MANAGEMENT OF TIERED STORAGE RESOURCES

(71) Applicant: Steven Michael Umbehocker, Mercer Island, WA (US)

(72) Inventor: Steven Michael Umbehocker, Mercer Island, WA (US)

(73) Assignee: OS NEXUS, INC., Mercer Island, WA (US)

( * ) Notice: Subject to any disclaimer, the term of this patent is extended or adjusted under 35 U.S.C. 154(b) by 305 days.

(21) Appl. No.: 13/621,933

(22) Filed: Sep. 18, 2012

(65) Prior Publication Data

US 2013/0073702 A1    Mar. 21, 2013

Related U.S. Application Data

(60) Provisional application No. 61/537,542, filed on Sep. 21, 2011.

(51) Int. Cl.
*G06F 15/173* (2006.01)
*G06F 3/06* (2006.01)
*G06F 9/50* (2006.01)

(52) U.S. Cl.
CPC .............. *G06F 3/0605* (2013.01); *G06F 3/067* (2013.01); *G06F 3/0631* (2013.01); *G06F 3/0685* (2013.01); *G06F 9/5016* (2013.01); *G06F 2209/504* (2013.01); *Y02B 60/142* (2013.01)

(58) Field of Classification Search
CPC . G06F 2209/504; G06F 3/0631; G06F 3/067; G06F 3/0685

USPC ................................................... 709/224–226
See application file for complete search history.

(56) References Cited

U.S. PATENT DOCUMENTS

| | | | |
|---|---|---|---|
| 7,051,121 B2* | 5/2006 | Ohno et al. | 710/5 |
| 7,234,032 B2* | 6/2007 | Durham et al. | 711/161 |
| 8,694,727 B2* | 4/2014 | Naganuma et al. | 711/117 |
| 2003/0105852 A1* | 6/2003 | Das et al. | 709/223 |
| 2004/0153606 A1* | 8/2004 | Schott | 711/114 |
| 2009/0235269 A1* | 9/2009 | Nakajima et al. | 718/104 |
| 2009/0300285 A1* | 12/2009 | Nagai et al. | 711/114 |
| 2013/0036266 A1* | 2/2013 | Naganuma et al. | 711/114 |

* cited by examiner

*Primary Examiner* — Mohamed Wasel
(74) *Attorney, Agent, or Firm* — Amin, Turocy & Watson, LLP

(57) ABSTRACT

Systems, methods, and apparatus for provisioning storage resources for customers from a distributed grid of disparate storage systems are presented herein. A storage tier component can sort, based on attributes of heterogeneous computer-readable storage media, the heterogeneous computer-readable storage media into tiers of storage to facilitate provisioning a portion of storage space of a tier of the tiers for a computing resource. Further, the storage tier component can receive an input from a device for provisioning of the portion of the storage space of the tier, and configure, based on the input, a storage resource to facilitate access between the portion of the storage space of the tier and the computing resource. Furthermore, a tracking component can create an account associated with a customer that is associated with the device to facilitate tracking and/or limiting of utilization of the portion of the storage space of the tier by the customer.

20 Claims, 10 Drawing Sheets

GLOBAL MANAGEMENT OF TIERED STORAGE RESOURCES

PRIORITY CLAIM

This application claims priority to U.S. Provisional Patent Application Ser. No. 61/537,542, filed on Sep. 21, 2011, entitled "CLOUD INTEGRATION", the entirety of which is incorporated by reference herein.

TECHNICAL FIELD

This disclosure relates generally to data storage including, but not limited to, global management of tiered storage resources.

BACKGROUND

Providing disparate computer-readable storage resources that are located across multiple data centers for computing resources is complex, as conventional storage technologies utilize technical staff to manage, allocate, etc. such storage resources for hundreds, thousands, etc. of diverse computing resources. Further, such conventional storage technologies are error prone and economically limiting.

The above-described deficiencies of today's computer-readable storage environments and related technologies are merely intended to provide an overview of some of the problems of conventional technology, and are not intended to be exhaustive, representative, or always applicable. Other problems with the state of the art, and corresponding benefits of some of the various non-limiting embodiments described herein, may become further apparent upon review of the following detailed description.

SUMMARY

A simplified summary is provided herein to help enable a basic or general understanding of various aspects of illustrative, non-limiting embodiments that follow in the more detailed description and the accompanying drawings. This summary is not intended, however, as an extensive or exhaustive overview. Instead, the sole purpose of this summary is to present some concepts related to some illustrative non-limiting embodiments in a simplified form as a prelude to the more detailed description of the various embodiments that follow. It will also be appreciated that the detailed description may include additional or alternative embodiments beyond those described in this summary.

In accordance with one or more embodiments and corresponding disclosure, various non-limiting aspects are described in connection with dynamically provisioning storage resource(s) for customer(s) from a distributed grid of disparate, geographically dispersed, etc. storage systems and networks. In one or more aspects, computer-readable storage media of the disparate storage systems can be automatically, dynamically, etc. grouped, sorted, etc. into storage tiers, grades, ranks, levels, etc. based on respective qualities, e.g., performance, size, geographical location, etc. of the storage media. Further, a selection of a quantity and a geographical location of storage to be provisioned from one of the storage tiers, based on a cost, can be received from a customer device or portal. Furthermore, a designation of a computing resource, system, server, device, mobile device, virtual machine, virtual storage appliance, etc. to be assigned, e.g., communicatively coupled, etc. to the storage can be received from the customer device. Furthermore, the storage can be automatically, dynamically, etc. provisioned for use by the computing resource by configuring storage resource(s), e.g., storage network component(s), e.g., storage network switch(es), virtual local area networks (VLANs), virtual storage area networks (VSANs), virtual host bus adaptors (HBAs), etc. to deliver, communicatively couple, etc. the storage to the computing resource.

In various embodiments, a storage tier component can sort, group, add, organize, etc. heterogeneous, e.g., disparate, geographically dispersed, etc. computer-readable storage media of, e.g., a storage system, a storage appliance, a solid state disk (SSD), etc. into tiers, grades, levels, ranks, etc. of storage based on attributes of the heterogeneous computer-readable storage media, to facilitate provisioning a portion, e.g., a storage volume, a portion of a pool, etc. of the storage from a tier of the tiers for a computing resource, e.g., a system, a server, a device, a virtual machine, a virtual storage appliance, a mobile device, etc.

In an aspect, the attributes can include a size, a capability, a fail over capability, a service level agreement, a cost, a geographical location, a geographical location of a data center, a performance level, a quality of service, a storage grade, an availability, a type of storage medium, a fault tolerance level, a software vendor of software, a hardware vendor of hardware, a hardware version of the hardware, a software version of the software, etc. associated with a storage medium of the heterogeneous computer-readable storage media.

Further, the storage tier component can receive an input from a device for provisioning of the portion of the storage from the tier. In one aspect, the input can represent, indicate, etc. a size of the portion of the storage, a quality, e.g., level of performance, availability, etc. of the portion of the storage, a geographical location of the portion of the storage, one or more properties of the computing resource, etc. Further, the storage tier component can facilitate access of the portion of the storage by the computing resource.

Furthermore, the storage tier component can configure, dynamically configure, etc. a storage fabric, a storage resource, e.g., a storage system, a host, a hypervisor, a network component, e.g., a virtual local area network (VLAN) component, a virtual storage area network (VSAN) component, a virtual host bus adaptor (HBA), etc. to facilitate access between the portion of the storage and the computing resource, e.g., to communicatively couple the computing resource to the storage so that the portion can be utilized by the computing resource, to effectively deliver the storage to the computing resource, etc.

In one embodiment, a tracking component can create an account associated with a customer that is associated with the device to facilitate tracking of utilization of the portion of the storage by the customer. In an aspect, the tracking component can limit utilization of the portion of the storage by the customer based on a predetermined quota, condition, etc. associated with the access, e.g., to limit an effect on use of other portions of the storage by other customers. In another aspect, the tracking component can update a data store with information that represents available storage space of the tier in response to a facilitation of the access between the portion of the storage and the computing resource.

In another embodiment, a storage management component can receive administration credentials to facilitate access to the heterogeneous computer-readable storage media, and add/remove the portion of the storage to/from the tier using the administrative credentials.

In yet another embodiment, a network crawler component can receive credentials, e.g., a user name and/or a password identification (ID), etc. associated with network resources including the storage resource, and in an aspect store the credentials in a data store for access/configuration of the network resources. Further, the network crawler component can discover, build, map, identify, etc. a topology of a fabric, network fabric, etc. of the network resources, based on the credentials. The network resources can include network endpoints, for example, that can be associated with hardware identifiers including, e.g., a media access control (MAC) address for Ethernet hardware, a World Wide Name (WWN) and/or a World Wide Identifier (WWID) associated with, e.g., Fibre Channel (FC), Advanced Technology Attachment (ATA), Serial Attached Small Computer System Interface (SCSI) (SAS), etc. resources and/or nodes, switches, etc. Further, the network crawler component can communicatively couple, using the topology, the credentials, etc. the storage resource to the portion of the storage and the computing resource. For example, the network crawler component can log into network switch(es), based on one or more of the credentials, to communicatively couple, via the network switch(es), the storage resource to the portion of the storage and the computing resource.

In an embodiment, the network crawler component can communicatively couple the storage resource to a virtual resource, e.g., a virtual storage appliance allocated in a hypervisor cluster, or a virtual machine manager (VMM) cluster, as a virtual machine, operating platform, etc.

In another embodiment, a quality of service (QoS) component can determine a QoS setting associated with the access based on the input. For example, the QoS setting can include a predetermined condition representing an availability of the storage, a bandwidth associated with a transfer of data between the computing resource and the storage, etc. Further, the QoS component can configure a bandwidth setting associated with the storage resource, e.g., select and/or configure a network switch, a VLAN, a VSAN, etc. of the network topology based on the QoS setting.

In yet another embodiment, an account management component, e.g., communicatively coupled to the tracking component, can determine a fee to "charge back" to the customer associated with the account, e.g., according to an amount of storage that was provisioned and/or utilized by the customer.

In one embodiment, an application programming interface (API) component can facilitate discovering the tiers and/or attributes of the tiers utilizing an API. Further, the API component can facilitate modifying the tiers, creating the account associated with the customer, tracking utilization of the portion of the storage, and/or configuring, assigning, etc. the storage resource.

In one non-limiting implementation, a method can include grouping, by a system including a processor, heterogeneous, e.g., geographically dispersed, etc. storage into grades, tiers, levels, ranks, etc. of storage based on characteristics of the heterogeneous storage for facilitating provisioning storage space from a grade of the grades. Further, the method can include receiving a request, an input, etc. for provisioning of the storage space from the grade. Furthermore, the method can include communicatively coupling the storage space to a computing resource, e.g., a mobile device, a system, a server, a virtual machine, a virtual storage appliance, etc. via a network resource, e.g., a VLAN component, a VSAN component, etc. based on the request.

In another embodiment, the method can include receiving credentials, e.g., passwords, network identifiers, etc. associated with network resources including the network resource. Further, the method can include mapping, using the credentials, a topology of a fabric of the network resources including network endpoints. Furthermore, the method can include communicatively coupling the storage space to the computing resource according to the topology of the fabric of the network resources.

In yet another embodiment, the method can include tracking usage of the storage space, and billing a customer account associated with the request in response to the tracking of the usage. In one embodiment, the method can further include limiting the usage of the storage space based on a predetermined condition associated with the grade.

Another non-limiting limitation can include a computer-readable storage medium comprising computer executable instructions that, in response to execution, cause a computing system including a processor to perform operations. Further, the operations can include adding heterogeneous storage resources to ranks, tiers, levels, stages, etc. of storage resources based on attributes of the storage resources; receiving a request for communicatively coupling one or more portions of a rank of the ranks to a computing resource; and facilitating, based on the request, access between the portion of the rank and the computing resource.

In one embodiment, the operations can include discovering, mapping, recording, etc. a topology of a communication fabric of network resources communicatively coupled to the ranks of storage resources. Further, the operations can include communicatively coupling the portion of the rank to the computing resource according to the topology of the communication fabric.

In another embodiment, the operations can include configuring a network switch, e.g., a virtual switch, etc. of the network resources, and communicatively coupling the portion of the rank to the computing resource via the network switch. In yet another embodiment, the operations can include limiting the access based on a quota, a predetermined condition, etc. representing a limit of a use of the portion of the rank.

Other embodiments and various non-limiting examples, scenarios, and implementations are described in more detail below.

BRIEF DESCRIPTION OF THE DRAWINGS

Various non-limiting embodiments are further described with reference to the accompanying drawings in which.

DETAILED DESCRIPTION

Figure 1:
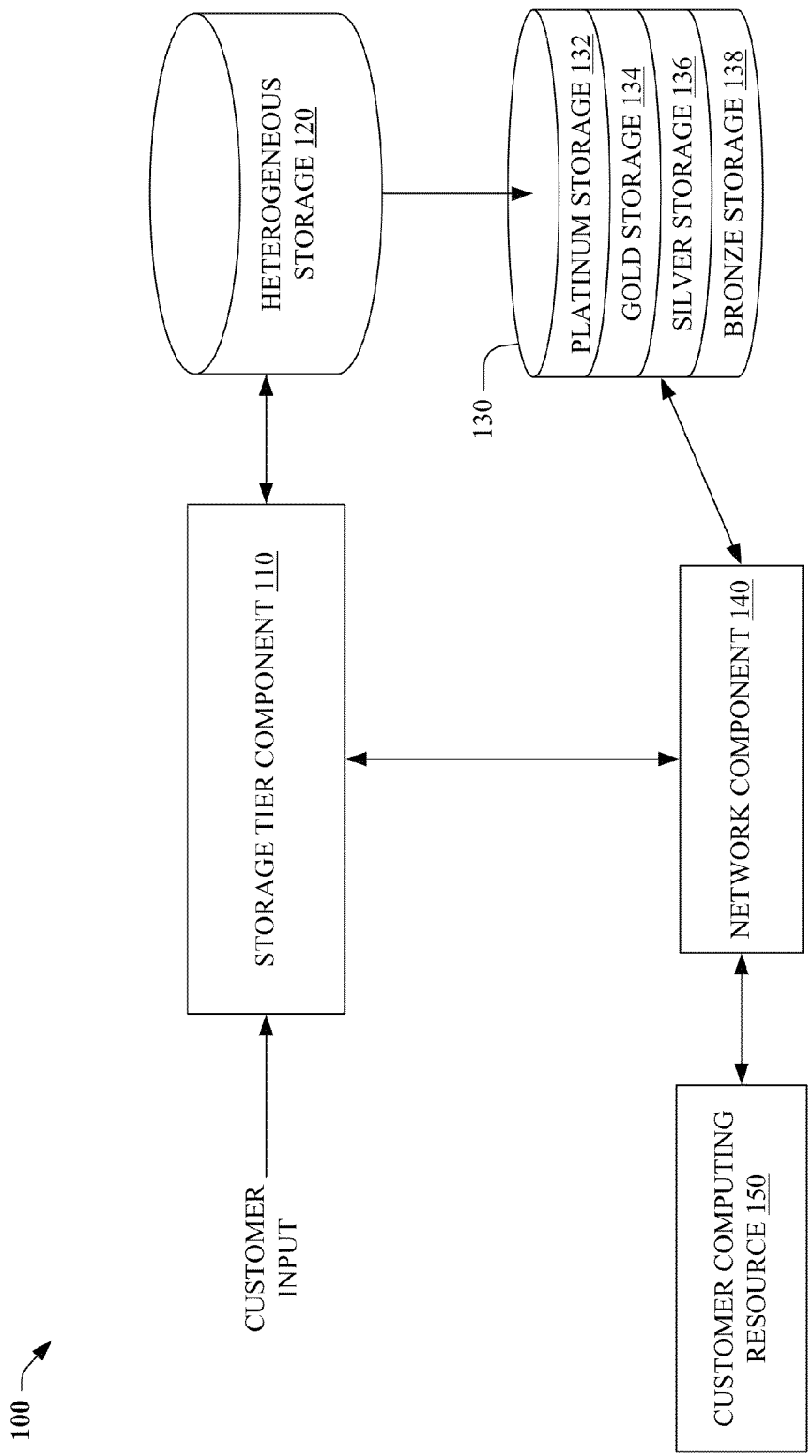
FIG. 1 illustrates a block diagram of a tiered storage infrastructure, in accordance with an embodiment.

Various non-limiting embodiments of systems, methods, and apparatus presented herein dynamically provision storage resource(s) for customer(s) from a distributed grid of geographically dispersed storage systems. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used, via storage tier component 110 (see below), to sort, based on attributes of heterogeneous computer-readable storage media, the heterogeneous computer-readable storage media into tiers of storage to facilitate provisioning a portion of storage space of a tier of the tiers for a computing resource. Further, the artificial intelligence system can configure, via storage management component 110, a storage resource of a network to facilitate access between the portion of the storage space of the tier and the computing resource in response to receiving an input for provisioning of the portion of the storage space from the tier.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As described above, conventional techniques cannot adequately provide cost effective, reliable, etc. allocation of geographically dispersed computer-readable storage resources across multiple locations for hundreds, thousands, etc. of disparate computing resources. Compared to such technology, various systems, methods, and apparatus described herein in various embodiments can improve user experience(s) by dynamically provisioning storage resources from a distributed grid of disparate storage systems.

Referring now to FIG. 1, a block diagram of a tiered storage infrastructure 100 is illustrated, in accordance with an embodiment. Aspects of tiered storage infrastructure 100, and systems, networks, other apparatus, and processes explained herein can constitute machine-executable instructions embodied within machine(s), e.g., embodied in one or more computer readable mediums (or media) associated with one or more machines. Such instructions, when executed by the one or more machines, e.g., computer(s), computing device(s), virtual machine(s), etc. can cause the machine(s) to perform the operations described.

Additionally, the systems and processes explained herein can be embodied within hardware, such as an application specific integrated circuit (ASIC) or the like. Further, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Tiered storage infrastructure 100 can include storage tier component 110 and heterogeneous storage 120. Heterogeneous storage 120 can include geographically dispersed computer-readable storage media, e.g., a storage system, a storage appliance, a solid state disk (SSD), a virtual storage appliance, a storage pool, etc. In an aspect, storage tier component 110 can sort, group, add, organize, etc. heterogeneous storage 120 into tiers of storage 130, based on attributes of heterogeneous storage 120, to facilitate provisioning a portion, e.g., a storage volume, a portion of the storage pool, etc. of the storage from a tier (e.g., 132, 134, 136, 138) of tiers of storage 130 for customer computing resource 150, e.g., a system, a server, a device, a virtual machine, a virtual storage appliance, a mobile device, etc.

In an aspect, the attributes can include a size, a capability, a fail over capability, a service level agreement, a cost, a geographical location, a geographical location of a data center, a performance level, a quality of service, a storage grade, an availability, a type of storage medium, a fault tolerance level, a software vendor of software, a hardware vendor of hardware, a hardware version of the hardware, a software version of the software, etc. associated with a storage medium of heterogeneous storage 120.

Figure 2:
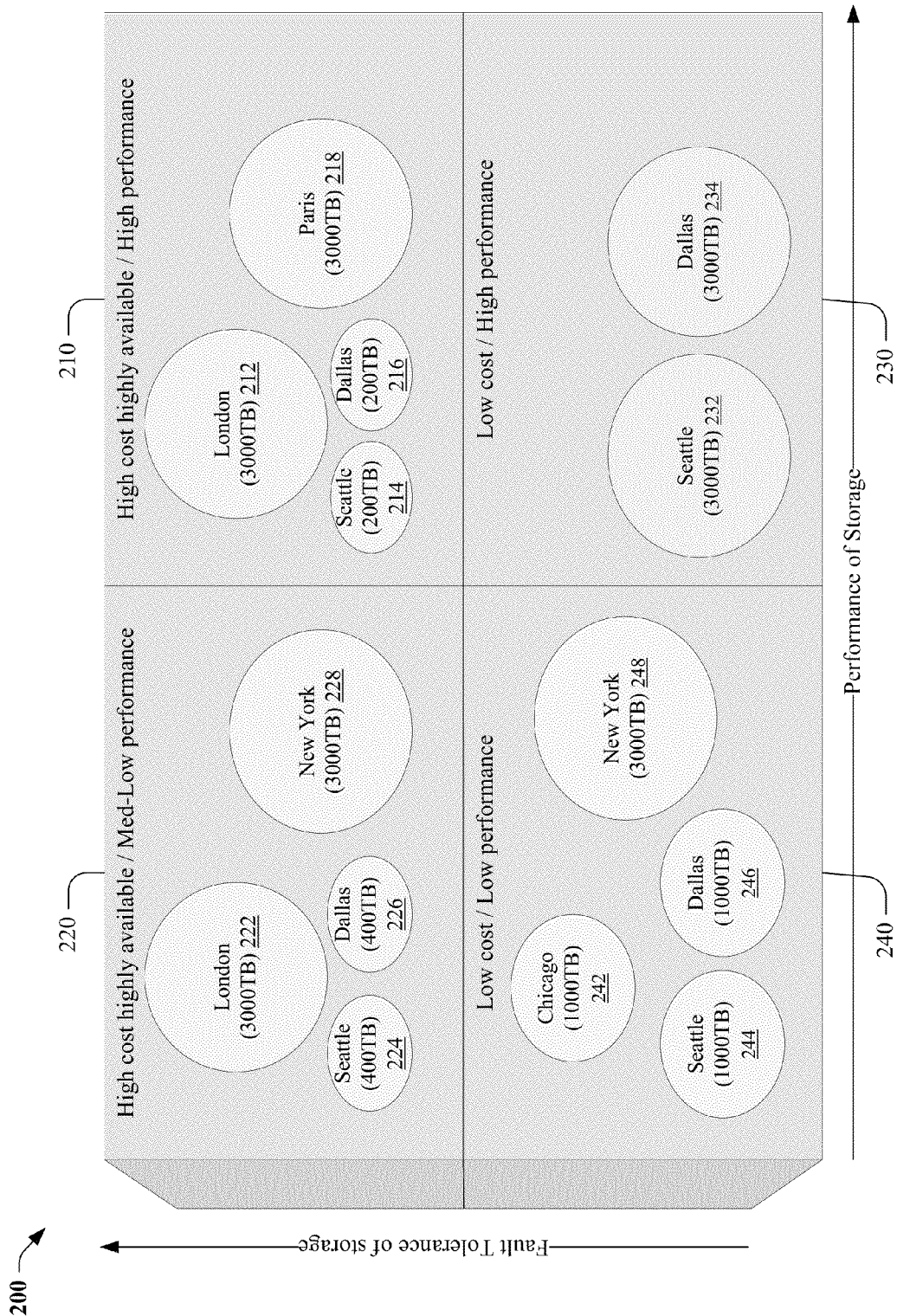
FIG. 2 illustrates a block diagram of another tiered storage infrastructure, in accordance with an embodiment.

For example, as illustrated by FIG. 2, storage tier component 110 can sort heterogeneous storage 120 into tiers of storage 130 according to varying performance and/or fault tolerance levels of storage. For example, platinum storage tier 132, e.g., tier 210, is be associated with high cost, highly available, high performance computer-readable storage (London 3000 terabyte (TB) storage 212, Seattle 200 TB storage 214, Dallas 200 TB storage 216, Paris 3000 TB storage 218) that is associated with a level of QoS that is higher than a level of QoS of gold storage tier 134, e.g., tier 220, which is associated with high cost, highly available, medium low performance computer-readable storage (London 3000 TB storage 222, Seattle 400 TB storage 224, Dallas 400 TB storage 226, New York 3000 TB storage 228).

Further, silver storage tier 136, e.g., tier 230, can be associated with low cost, high performance computer-readable storage (Seattle 3000 TB storage 232, Dallas 3000 TB storage 234) that is associated with a level of QoS that is lower than the level of QoS of gold storage tier 134, but higher than a level of QoS of bronze storage tier 138, e.g., tier 240, which is associated with low cost, low performance computer-readable storage (Chicago 1000 TB storage 242, Seattle 1000 TB storage 244, Dallas 1000 TB storage 246, New York 3000 TB storage 248).

Figure 3:
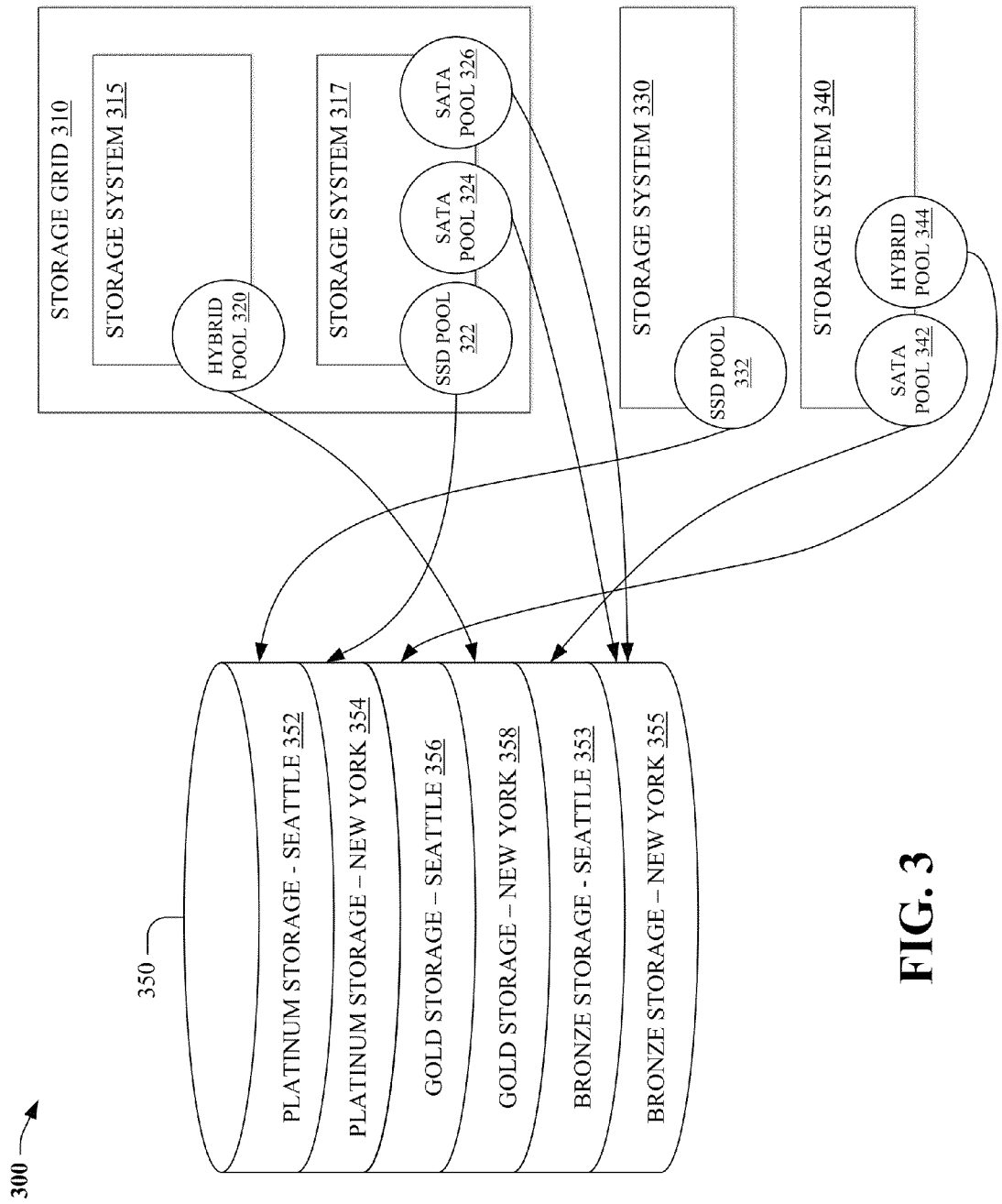
FIG. 3 illustrates a block diagram of yet another tiered storage infrastructure, in accordance with an embodiment.

In another embodiment illustrated by FIG. 3, storage tier component 110 can derive storage tiers 350 utilizing storage from storage systems storage grid 310, storage system 330, and storage system 340. As such, platinum storage 352 located in Seattle includes storage from solid state drive (SSD) storage pool 332; platinum storage 354 located in New York includes storage from SSD storage pool 322, Serial Advanced Technology Attachment (SATA) storage pool 324, and SATA storage pool 326; gold storage 356 located in Seattle includes storage from hybrid storage pool 344; gold storage 358 located in New York includes storage from hybrid storage pool 320; bronze storage 353 located in Seattle includes storage from SATA storage pool 342; and bronze storage 355 located in New York includes storage from SATA storage pool 324 and SATA storage pool 326.

Referring again to FIG. 1, storage tier component 110 can receive an input, e.g., via the Internet, etc. from a device for provisioning a portion of storage from a tier (132, 134, 136, 138) of tiers of storage 130. In one aspect, the input can represent, indicate, etc. a size of the portion of the storage, a quality, e.g., level of performance, availability, etc. of the portion of the storage, a geographical location of the portion of the storage, one or more properties of a computing resource, e.g., customer computing resource 150, etc.

Further, based on the input, storage tier component 110 can configure, dynamically configure, etc. network component 140, e.g., a storage fabric, a storage resource, a storage system, a host, a hypervisor, a virtual local area network (VLAN) component, a virtual storage area network (VSAN) component, a virtual host bus adaptor (HBA), etc. to facilitate access between the portion of the storage from the tier and customer computing resource 150, e.g., communicatively coupling customer computing resource 150 to the storage from the tier.

In one aspect, the storage from the tier can include various computer-readable storage technologies, e.g., virtual hard disk device (VHD) file(s), physical SCSI device(s), SATA device(s), Serial Attached SCSI (SAS) device(s), Serial Storage Architecture (SSA) device(s), and/or SSD device(s). In another aspect, network component 140 can be communicatively coupled between the storage from the tier and customer computing resource 150 utilizing a Small Computer System Interface (SCSI), which is a peripheral, peer-to-peer interface that can be used, e.g., in personal computer (PC) server systems; a SCSI-over-Fiber Channel protocol; an SAS protocol; an Internet SCSI (iSCSI) protocol, which is an Internet Protocol (IP) based storage networking standard for linking data storage facilities and/or entities; an Advanced Technology (AT) Attachment (ATA) interface, an ATA over Ethernet (AoE) interface, other Storage Area Network (SAN) protocol(s), etc.

Figure 4:
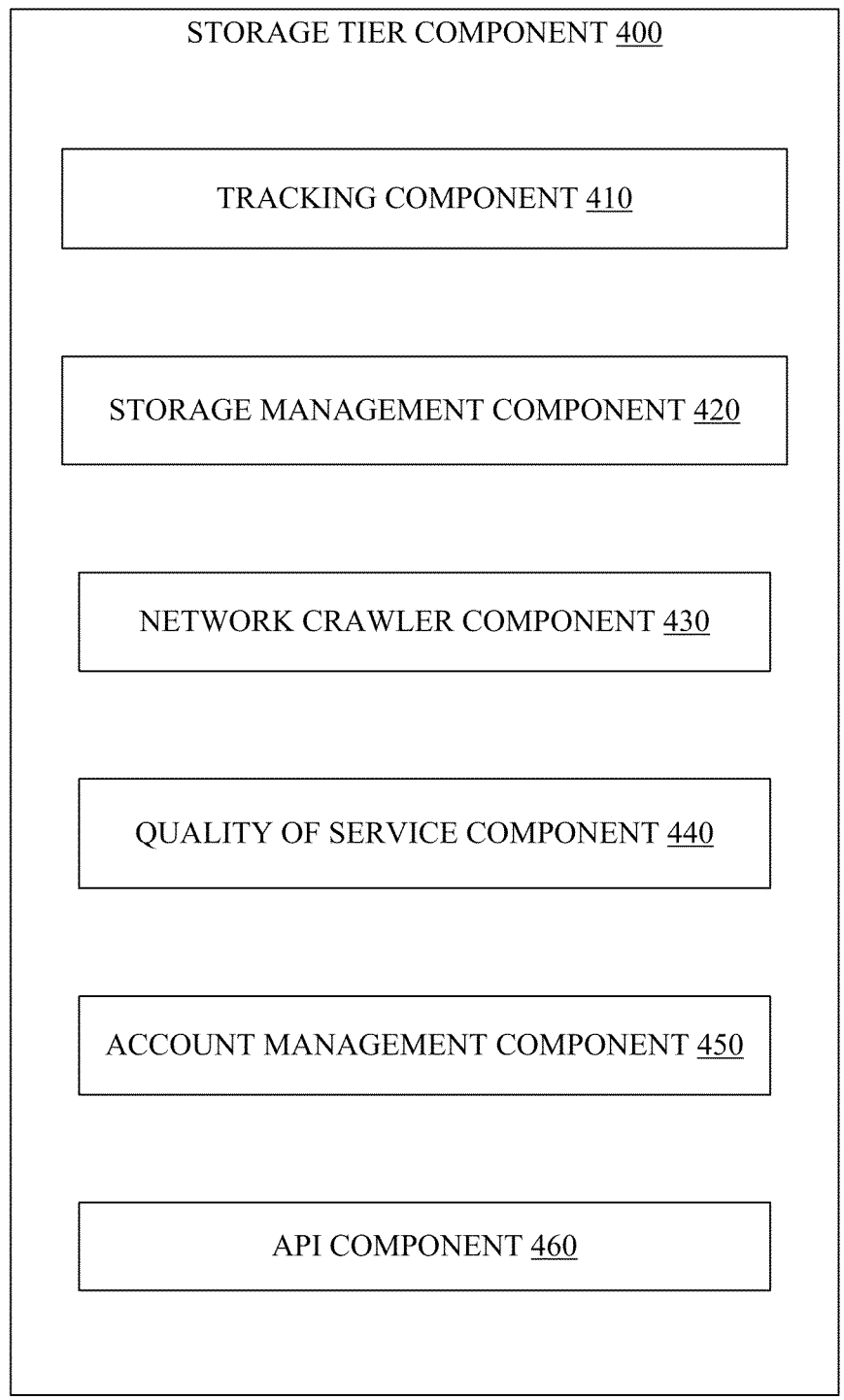
FIG. 4 illustrates a block diagram of a storage tier component, in accordance with an embodiment.

Now referring to FIG. 4, a block diagram 400 of storage tier component 400 is illustrated, in accordance with an embodiment. Storage tier component 400 includes tracking component 410, storage management component 420, network crawler component 430, quality of service component 440, account management component 450, and application programming interface component 460.

In one embodiment, tracking component 410 can create an account associated with a customer that is associated with customer computing resource 150 to facilitate tracking, monitoring, recording, etc. of utilization of the portion of the storage from the tier by the customer. In an aspect, tracking component 410 can limit utilization of the portion of the storage by the customer based on a predetermined quota, condition, etc. associated with the access, e.g., to limit an effect on use of other portions of the storage by other customers. For example, in response to the tracking revealing use of the portion of the storage reducing an overall bandwidth associated with access of other portions of the storage of the tier by another customer, tracking component 410 can alert the customer that another tier of storage, e.g., associated with a higher level of performance, should be selected by the consumer, and/or can alert the customer that limits associated with the use of the tier have been imposed on the account. In another embodiment, tracking component 410 can update a data store (not shown) with information representing available storage space of the tier, e.g., in response to use of the tier by the customer.

In another embodiment, storage management component 420 can receive administration credentials to facilitate access to portion(s) of heterogeneous storage 120, e.g., for sorting, mapping, dividing, etc. storage of heterogeneous storage 120 into tiers of storage 130 using the administrative credentials.

In yet another embodiment, network crawler component 430 can receive credentials, e.g., a user name and/or a password identification (ID), etc. associated with network resources, e.g., of network component 140, etc. including the storage resource, and in an aspect store the credentials in a data store for access/configuration of the network resources. Further, network crawler component 430 can discover, build, map, identify, etc. a topology of a fabric, network fabric, etc. of the network resources, e.g., associated with network component 140, based on the credentials. The network resources can include network endpoints, for example, that can be associated with hardware identifiers including, e.g., a MAC address for Ethernet hardware, a WWN and/or a WWID associated with, e.g., FC, ATA, SCSI SAS, etc. resources and/or nodes, switches, etc.

Further, network crawler component 430 can communicatively couple, using the topology, the credentials, etc. the storage resource, e.g., a VLAN component, a VSAN component, a virtual HBA, etc. to the portion of storage of the tier and customer computing resource 150. For example, network crawler component 430 can log into network switch(es), based on one or more of the credentials, to communicatively couple, via the network switch(es), the storage resource to the portion of storage of the tier and customer computing resource 150. In one embodiment, network crawler component 430 can communicatively couple the portion of storage of the tier to a virtual resource, e.g., a virtual storage appliance allocated in a hypervisor cluster, or a VMM cluster, as a virtual machine, operating platform, etc.

In another embodiment, QoS component 440 can determine a QoS setting associated with the portion of storage of the tier based on the input. For example, the QoS setting can include a predetermined condition representing an availability of the portion of storage of the tier, a bandwidth associated with a transfer of data between customer computing resource 150 and the portion of storage of the tier, etc. Further, QoS component 440 can configure a bandwidth setting associated with the portion of storage of the tier, e.g., select and/or configure a network switch, a VLAN component, a VSAN component, etc. of network component 140 based on the QoS setting.

In yet another embodiment, account management component 450, e.g., communicatively coupled to tracking component 410, can determine a fee to "charge back" a fee to the customer associated with the account, e.g., according to an amount of storage that was provisioned and/or utilized by the customer.

In one embodiment, API component 460 can facilitate discovering tiers of tiers of storage 130 and/or attributes of the tiers utilizing an API, e.g., associated with an Internet based interface. Further, API component 460 can facilitate modifying tiers of storage 130, creating the account associated with the customer, tracking utilization of the portion of the tier of storage, and/or configuring, assigning, etc. the storage resource, e.g., a network switch, a VLAN component, a VSAN component, etc.

FIGS. 5-9 illustrate methodologies in accordance with the disclosed subject matter. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 5:
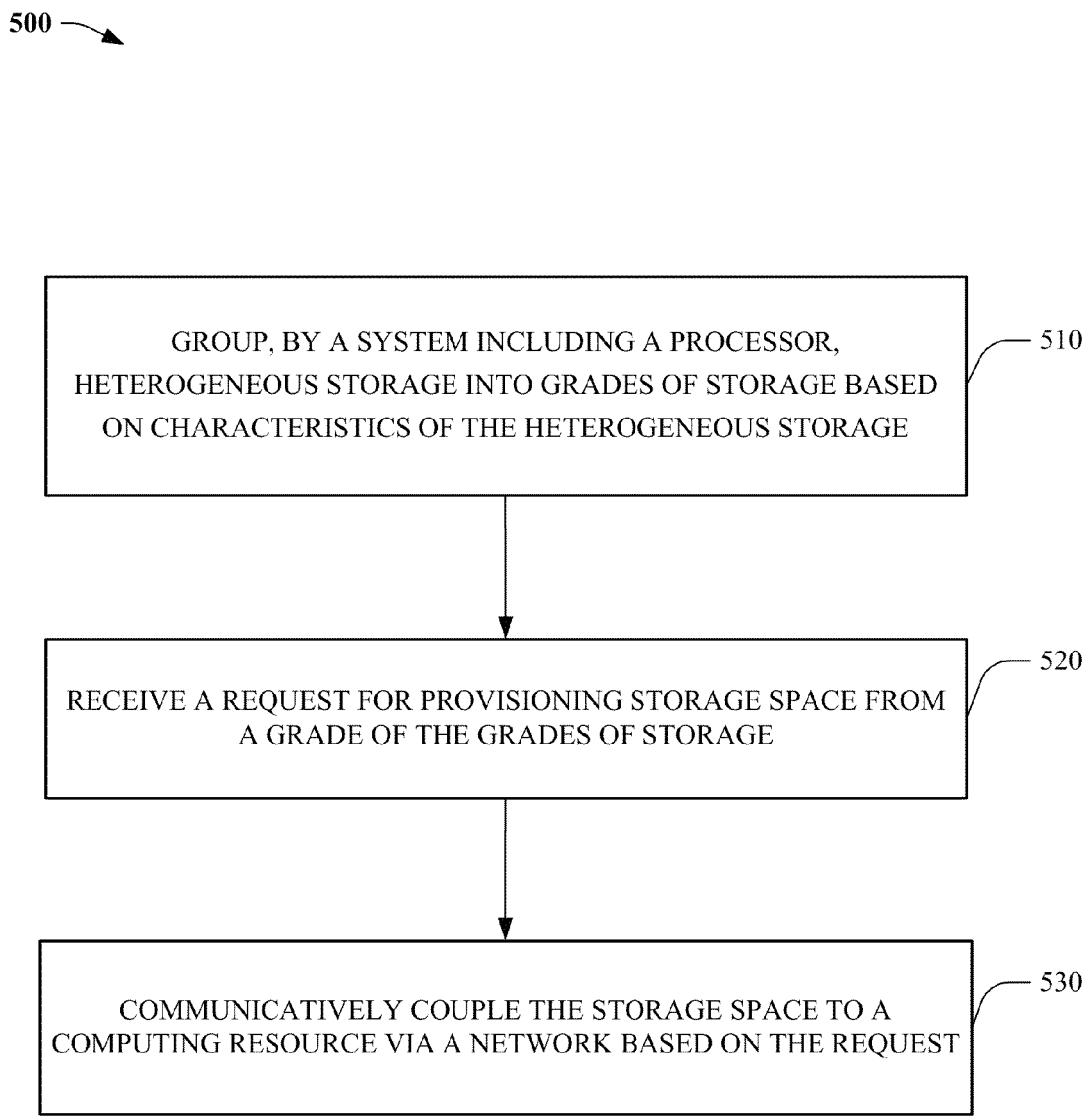
FIGS. 5-9 illustrate various processes associated with one or more tiered storage infrastructures, in accordance with various embodiments.
Figure 6:
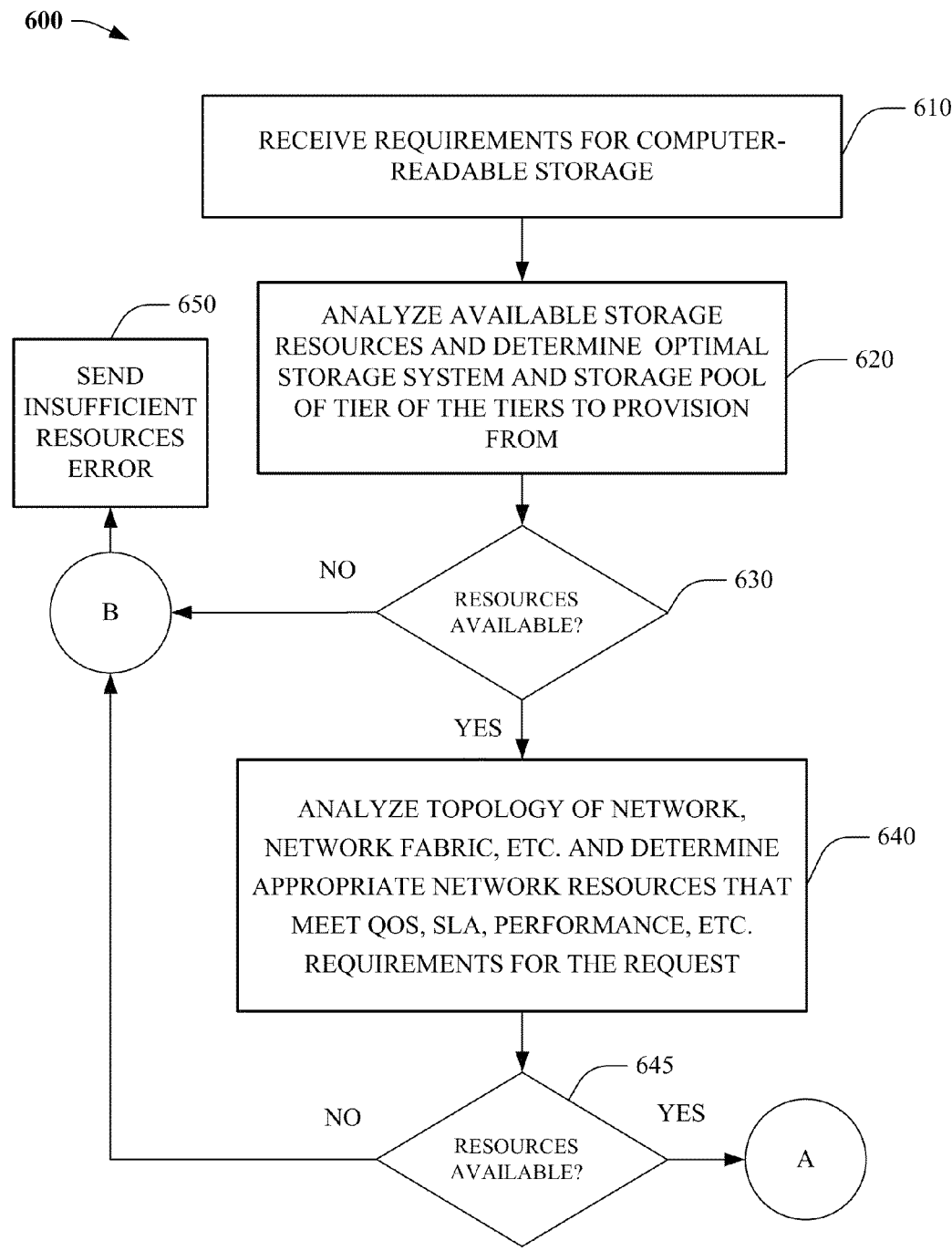
Figure 7:
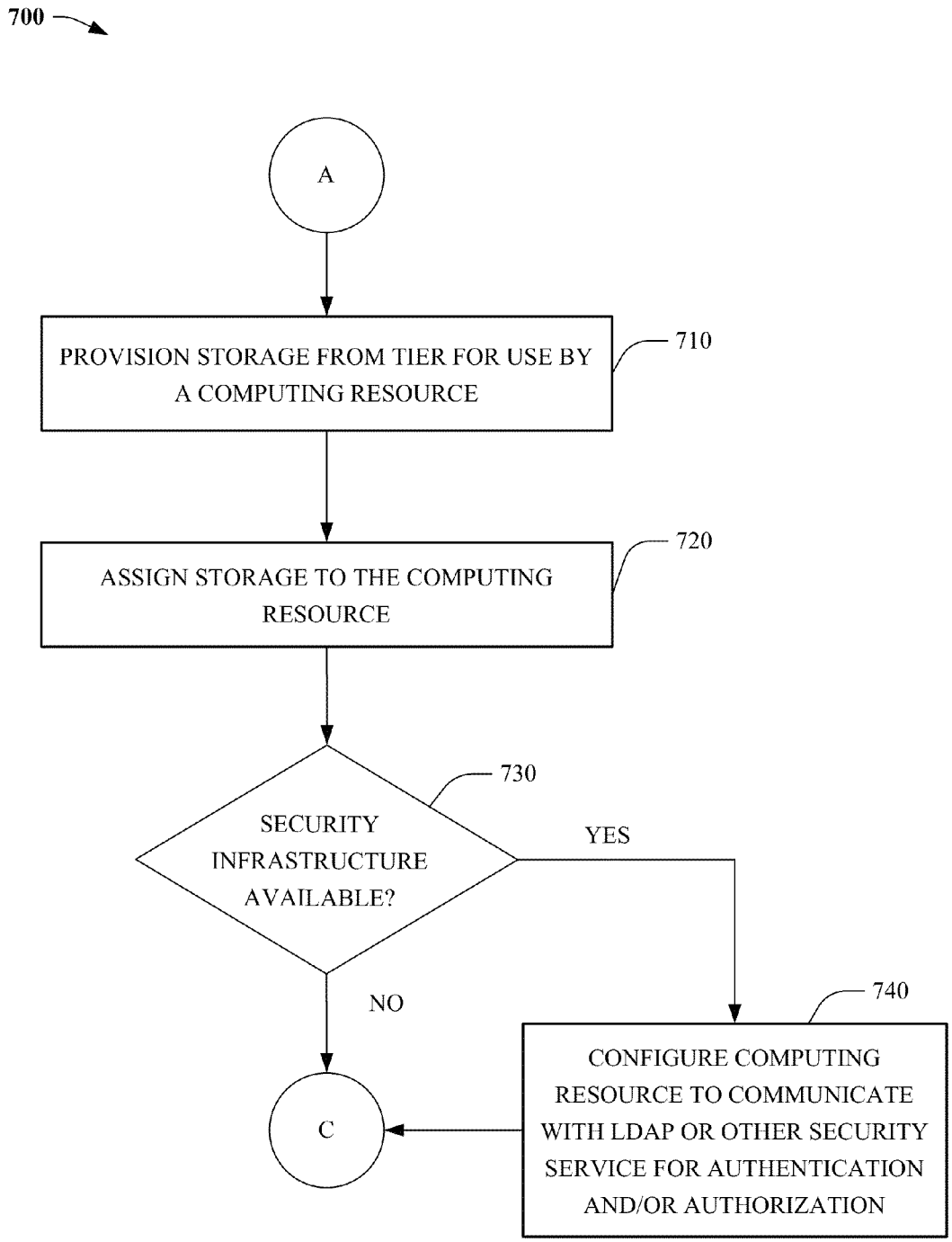
Figure 8:
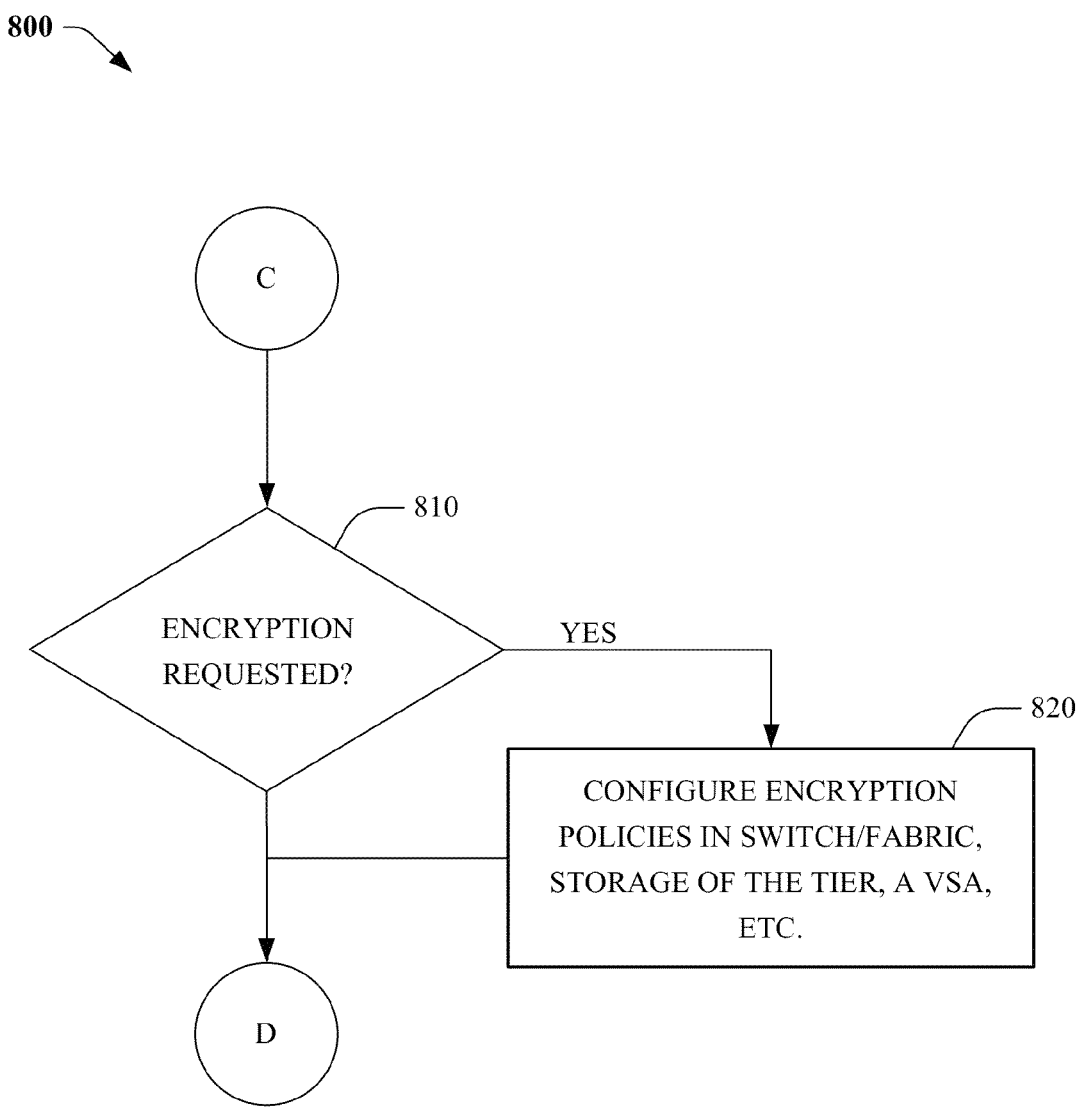
Figure 9:
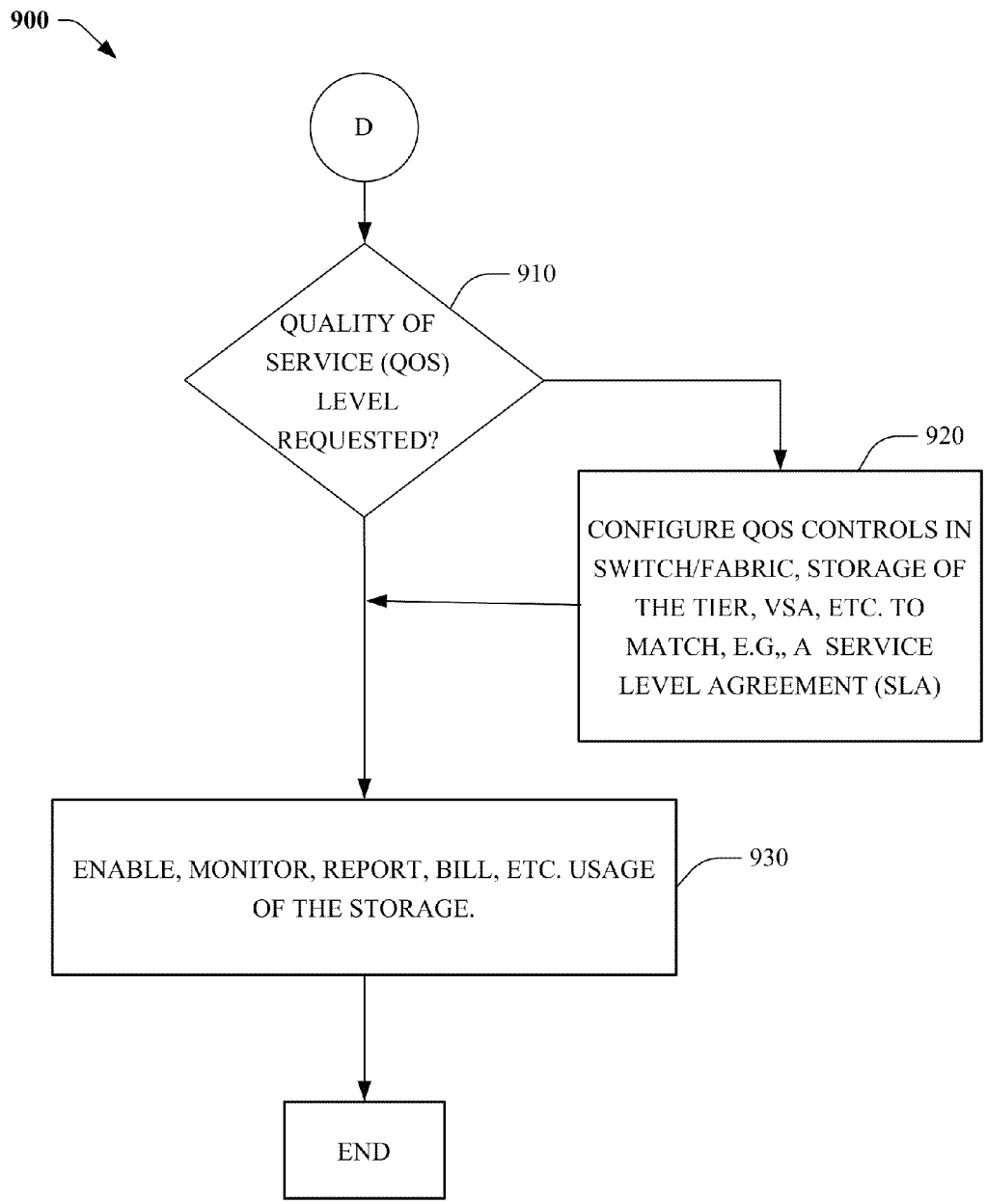

Referring now to FIG. 5, a process 500 associated with a storage tier component, e.g., 110, 400, etc. is illustrated, in accordance with an embodiment. At 510, heterogeneous storage, e.g., geographically dispersed computer-readable storage media, can be grouped, sorted, etc. into tiers, grades, levels, etc. of storage, by a system including a processor, based on characteristics, e.g., a size, a capability, a fail over capability, a service level agreement, a cost, a geographical location, a geographical location of a data center, a performance level, a quality of service, a storage grade, an availability, a type of storage medium, a fault tolerance level, a software vendor of software, a hardware vendor of hardware, a hardware version of the hardware, a software version of the software, etc. associated with the heterogeneous storage.

At 520, a request for provisioning storage space from a grade, a tier, a level, etc. of the grades, tiers, levels, etc. for use by a computing resource. In an aspect, the request can be received by the system via the Internet. At 530, storage space can be provisioned from the tier, e.g., communicatively coupled to a computing resource via one or more network components, resources, etc. for use by a computing resource based on the request.

FIGS. 6-9 illustrate other processes (600-900) associated with a storage tier component, e.g., 110, 400, etc., in accordance with an embodiment. At 610, requirement(s) for computer-readable storage can be received from a user or a cloud automation infrastructure, e.g., via an Internet based interface. Such requirements can include a location, a size, a level of performance, a fault tolerance, a cost, etc. of such storage. At 620, available storage resources from tiers of storage resources can be analyzed and an optimal storage system and storage pool, storage volume, etc. from a tier of the tiers can be determined to provision from. At 630, it can be determined whether such resources are available. If it is determined that such resources are not available, flow continues to 650, at which an insufficient resources error can be sent; otherwise, flow continues to 640, at which a topology of a network, network fabric, etc. communicatively coupled to the tiers can be analyzed to determine appropriate network resources that meet QoS, service level agreement, performance, etc. requirements for the request.

If it is determined at 645 that the network resources are available, then flow continues to 710, at which storage from the tier can be provisioned for use by a computing resource; otherwise flow continues to 650. Further, at 720, the storage can be assigned to the computing resource, e.g., utilizing a data store, etc.

At 730, if it is determined security infrastructure is available, then flow continues to 740, at which the computing resource can be configured to communicate with a Lightweight Directory Access Protocol (LDAP) or other security server for authentication and/or authorization. Otherwise, flow continues to 810, at which it can be determined whether encryption is requested. If encryption is requested, then flow continues to 820, at which encryption policies can be configured in a switch/fabric, the storage of the tier, a virtual storage appliance (VSA), etc. Otherwise, flow continues to 910, at which it can be determined whether a QoS level is requested. If the QoS level is requested, then flow continues to 920, at which QoS controls in the switch/fabric, the storage of the tier, the VSA, etc., can be configured to match, e.g., an SLA. At 930, usage of the storage of the tier can be enabled, monitored, reported, billed, etc.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," "storage medium," and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in storage systems described above, non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 10:
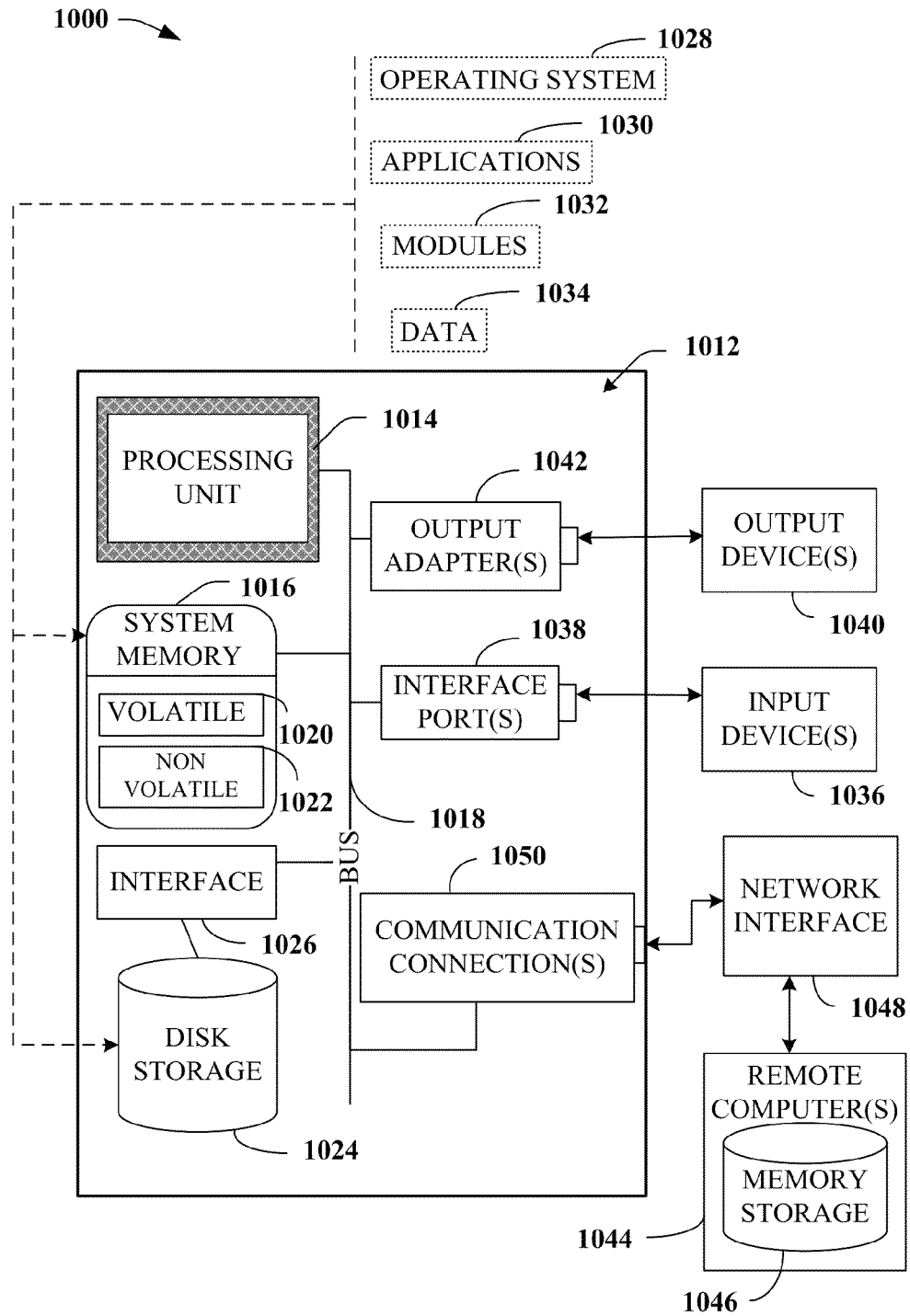
FIG. 10 illustrates a block diagram of a computing system operable to execute the disclosed systems and methods, in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented, e.g., various processes associated with FIGS. 1-9. While the subject matter has been described above in the general context of computer-executable instructions of a computer program that runs on a computer and/or computers, those skilled in the art will recognize that the subject innovation also can be implemented in combination with other program modules. Generally, program modules include routines, programs, components, data structures, etc. that perform particular tasks and/or implement particular abstract data types.

Moreover, those skilled in the art will appreciate that the inventive systems can be practiced with other computer system configurations, including single-processor or multiprocessor computer systems, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 10, a block diagram of a computing system 1000 operable to execute the disclosed systems and methods is illustrated, in accordance with an embodiment. Computer 1012 includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1194), and Small Computer Systems Interface (SCSI).

System memory 1016 includes volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 can also include removable/non-removable, volatile/non-volatile computer storage media, networked attached storage (NAS), e.g., SAN storage, etc. FIG. 10 illustrates, for example, disk storage 1024. Disk storage 1024 includes, but is not limited to, devices like a magnetic disk drive, floppy disk drive, tape drive, Jaz drive, Zip drive, LS-110 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

It is to be appreciated that FIG. 10 describes software that acts as an intermediary between users and computer resources described in suitable operating environment 1000. Such software includes an operating system 1028. Operating system 1028, which can be stored on disk storage 1024, acts to control and allocate resources of computer 1012. System applications 1030 take advantage of the management of resources by operating system 1028 through program modules 1032 and program data 1034 stored either in system memory 1016 or on disk storage 1024. It is to be appreciated that the disclosed subject matter can be implemented with various operating systems or combinations of operating systems.

A user can enter commands or information into computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 1014 through system bus 1018 via interface port(s) 1038. Interface port(s) 1038 include, for example, a serial port, a parallel port, a game port, and a universal serial bus (USB). Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
    at least one memory to store computer-executable instructions; and
    at least one processor, communicatively coupled to the at least one memory, that facilitates execution of the computer-executable instructions to at least:
        organize storage pools of a heterogeneous group of geographically dispersed storage systems based on a geographic location of the storage pools;
        sort the organized storage pools into storage provisioning tiers based on determined attributes of the organized storage pools;
        receive, from a client device, a request with a location requirement, a performance requirement, a capacity requirement, and a network protocol requirement for provisioning block storage from the storage provisioning tiers for a computing resource;
        select, based on the location, performance, capacity, and network protocol requirements, a storage pool of the organized storage pools for the provisioning of the block storage from the storage provisioning tiers for the computing resource;
        provision the block storage from the storage pool according to the location, performance, capacity, and network protocol requirements; and
        configure a storage system of the geographically dispersed storage systems to assign and allow an access to the block storage from the computing resource.

2. The system of claim 1, wherein the at least one processor further facilitates the execution of the computer-executable instructions to create an account associated with a customer that is associated with the client device to facilitate a tracking of utilization of a portion of the block storage by the customer.

3. The system of claim 2, wherein the at least one processor further facilitates the execution of the computer-executable instructions to limit the utilization of the portion of the block storage by the customer based on a predetermined quota associated with the access.

4. The system of claim 1, wherein the at least one processor further facilitates the execution of the computer-executable instructions to:
- receive administration credentials to facilitate another access to the block storage; and
- add a portion of the block storage to a storage provisioning tier of the storage provisioning tiers using the administrative credentials.

5. The system of claim 1, wherein the determined attributes include information representing at least one of a size of a portion of the block storage, a capability of the portion of the block storage, a fail over capability of the portion of the block storage, a service level agreement associated with the portion of the block storage, a cost associated with the portion of the block storage, a geographical location of the portion of the block storage, a geographical location of a data center associated with the portion of the block storage, a performance level of the portion of the block storage, a quality of service associated with the portion of the block storage, a storage grade of the portion of the block storage, an availability of the portion of the block storage, a type of storage medium of the portion of the block storage, a fault tolerance level of the portion of the block storage, a software vendor of software associated with the portion of the block storage, a hardware vendor of hardware associated with the portion of the block storage, a hardware version of the hardware, or a software version of the software.

6. The system of claim 1, wherein the at least one processor further facilitates the execution of the computer-executable instructions to:
- receive credentials associated with network resources including the storage pool;
- discover, based on the credentials, a topology of a fabric of the network resources including network endpoints; and
- communicatively couple, according to the topology, the storage pool to a portion of the block storage and the computing resource.

7. The system of claim 6, wherein the at least one processor further facilitates the execution of the computer-executable instructions to:
- communicatively couple the storage pool to a virtual resource.

8. The system of claim 1, wherein the at least one processor further facilitates the execution of the computer-executable instructions to:
- determine, based on the request, a quality of service setting associated with the access; and
- configure, based on the quality of service setting, a bandwidth setting of the storage pool.

9. The system of claim 1, wherein the at least one processor further facilitates the execution of the computer-executable instructions to:
- associate a portion of the block storage with an account; and
- track a status of the portion of the block storage for the account.

10. The system of claim 1, wherein the at least one processor further facilitates the execution of the computer-executable instructions to:
- update a data store with information that represents available storage space of the storage pool in response to a facilitation of the access.

11. The system of claim 1, wherein the at least one processor further facilitates the execution of the computer-executable instructions to:
- facilitate discovery of the organized storage pools and the determined attributes of the organized storage pools utilizing an application programming interface.

12. The system of claim 1, wherein the at least one processor further facilitates the execution of the computer-executable instructions to:
- facilitate, utilizing an application programming interface, at least one of:
  - modification of the organized storage pools;
  - creation of a customer account associated with the client device;
  - track utilization of a portion of the block storage; or
  - configure the storage resource.

13. A method, comprising:
- grouping, by a system including a processor, storage pools of a heterogeneous group of geographically dispersed storage systems based on a geographic location of the storage pools;
- sorting the storage pools into storage provisioning tiers based on determined attributes of the storage pools;
- receiving, from a client device, a request comprising a location requirement, a performance requirement, a capacity requirement, and a network protocol requirement for provisioning block storage from the storage provisioning tiers for a computing resource;
- selecting, based on the location, performance, capacity, and network protocol requirements, a storage pool of the storage pools for the provisioning of the block storage from the storage provisioning tiers for the computing resource;
- provisioning the block storage from the storage pool based on the location, performance, capacity, and network protocol requirements, wherein the provisioning comprises assigning and communicatively coupling the block storage to the computing resource to facilitate an access to the block storage from the computing resource.

14. The method of claim 13, wherein the communicatively coupling the block storage to the computing resource further includes:
- receiving credentials associated with network resources;
- mapping, using the credentials, a topology of a fabric of the network resources including network endpoints; and
- communicatively coupling the block storage to the computing resource according to the topology of the fabric of the network resources.

15. The method of claim 13, further comprising:
- tracking usage of the block storage; and
- billing a customer account associated with the request in response to the tracking of the usage.

16. The method of claim 13, further comprising:
- limiting usage of the block storage based on a predetermined condition associated with a grade of the block storage.

17. A non-transitory computer-readable storage medium comprising computer executable instructions that, in response to execution, cause a computing system comprising a processor to perform operations, comprising:
- organizing storage pools of a heterogeneous group of geographically dispersed storage systems based on a geographic location of the storage pools;
- sorting the organized storage pools into storage provisioning tiers based on determined attributes of the storage pools;
- receiving, from a client device, a request comprising a location requirement, a performance requirement, a capacity requirement, and a network protocol requirement for provisioning block storage from the storage provisioning tiers for a computing resource;
- selecting, based on the location requirement, the performance requirement, the capacity requirement, and the network protocol requirement, a storage pool for the provisioning of the block storage from the storage provisioning tiers for the computing resource;

provisioning the block storage from the storage pool based on the location requirement, the performance requirement, the capacity requirement, and the network protocol requirement; and configuring a storage system of the geographically dispersed storage systems for facilitating an access to the block storage from the computing resource.

18. The non-transitory computer-readable storage medium of claim 17, wherein the facilitating the access further comprises:

discovering a topology of a communication fabric of network resources communicatively coupled to the storage provisioning tiers; and communicatively coupling the block storage to the computing resource according to the topology of the communication fabric.

19. The non-transitory computer-readable storage medium of claim 18, wherein the operations further comprise:

configuring a network switch of the network resources; and communicatively coupling the block storage to the computing resource via the network switch.

20. The non-transitory computer-readable storage medium of claim 17, wherein the operations further comprise:

limiting the access based on a quota associated with the request.

\* \* \* \* \*